United States Patent
Lavoie et al.

(10) Patent No.: US 11,300,001 B2
(45) Date of Patent: Apr. 12, 2022

(54) ELECTRICAL SYSTEM FOR AIRCRAFT

(71) Applicant: BOMBARDIER INC., Dorval (CA)

(72) Inventors: Claude J. P. Lavoie, Laval (CA); Jean-Hugues Li, Brossard (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/431,819

(22) Filed: Jun. 5, 2019

(65) Prior Publication Data

US 2019/0376405 A1 Dec. 12, 2019

Related U.S. Application Data

(60) Provisional application No. 62/681,323, filed on Jun. 6, 2018.

(51) Int. Cl.
| | |
|---|---|
| *F01D 15/10* | (2006.01) |
| *B64D 27/02* | (2006.01) |
| *B64F 3/02* | (2006.01) |
| *F02C 7/277* | (2006.01) |
| *F02C 7/32* | (2006.01) |
| *F02N 11/08* | (2006.01) |

(52) U.S. Cl.
CPC ............ *F01D 15/10* (2013.01); *B64D 27/02* (2013.01); *B64F 3/02* (2013.01); *F02C 7/277* (2013.01); *F02C 7/32* (2013.01); *F02N 11/08* (2013.01); *B64D 2027/026* (2013.01); *B64D 2221/00* (2013.01)

(58) Field of Classification Search
CPC ... F01D 15/10; B64D 27/02; B64D 2027/026; B64D 2221/00; B64F 3/02; F02C 7/277; F02C 7/32; F02N 11/08
See application file for complete search history.

(56) References Cited

U.S. PATENT DOCUMENTS

| | | | |
|---|---|---|---|
| 5,977,645 A * | 11/1999 | Glennon | H02J 4/00 290/40 F |
| 7,013,651 B2 | 3/2006 | Bruno et al. | |
| 7,936,082 B2 | 5/2011 | Boudyaf et al. | |
| 9,035,478 B2 | 5/2015 | Huang et al. | |
| 2006/0012177 A1 | 1/2006 | Hoppe | |
| 2013/0031912 A1 | 2/2013 | Finney et al. | |
| 2015/0143950 A1* | 5/2015 | Bedrine | B64D 27/24 74/661 |
| 2017/0218848 A1* | 8/2017 | Alstad | F16H 1/222 |
| 2017/0328282 A1* | 11/2017 | Jensen | F02C 7/32 |
| 2018/0112599 A1* | 4/2018 | Dalal | F02C 7/262 |

OTHER PUBLICATIONS

European Patent Office, Extended European Search Report dated Oct. 24, 2019 re application No. 19178567.4.

* cited by examiner

*Primary Examiner* — Viet P Nguyen
(74) *Attorney, Agent, or Firm* — Norton Rose Fulbright Canada LLP

(57) ABSTRACT

Systems and methods associated with electrical systems of aircraft are disclosed. A method disclosed herein comprises generating electricity using an electric generator operatively coupled to an engine of the aircraft, supplying the electricity generated using the electric generator to a baseline power bus; generating electricity using an electric starter generator operatively coupled to the engine; and supplying the electricity generated using the electric starter generator to a supplemental power bus independent from the baseline power bus.

15 Claims, 8 Drawing Sheets

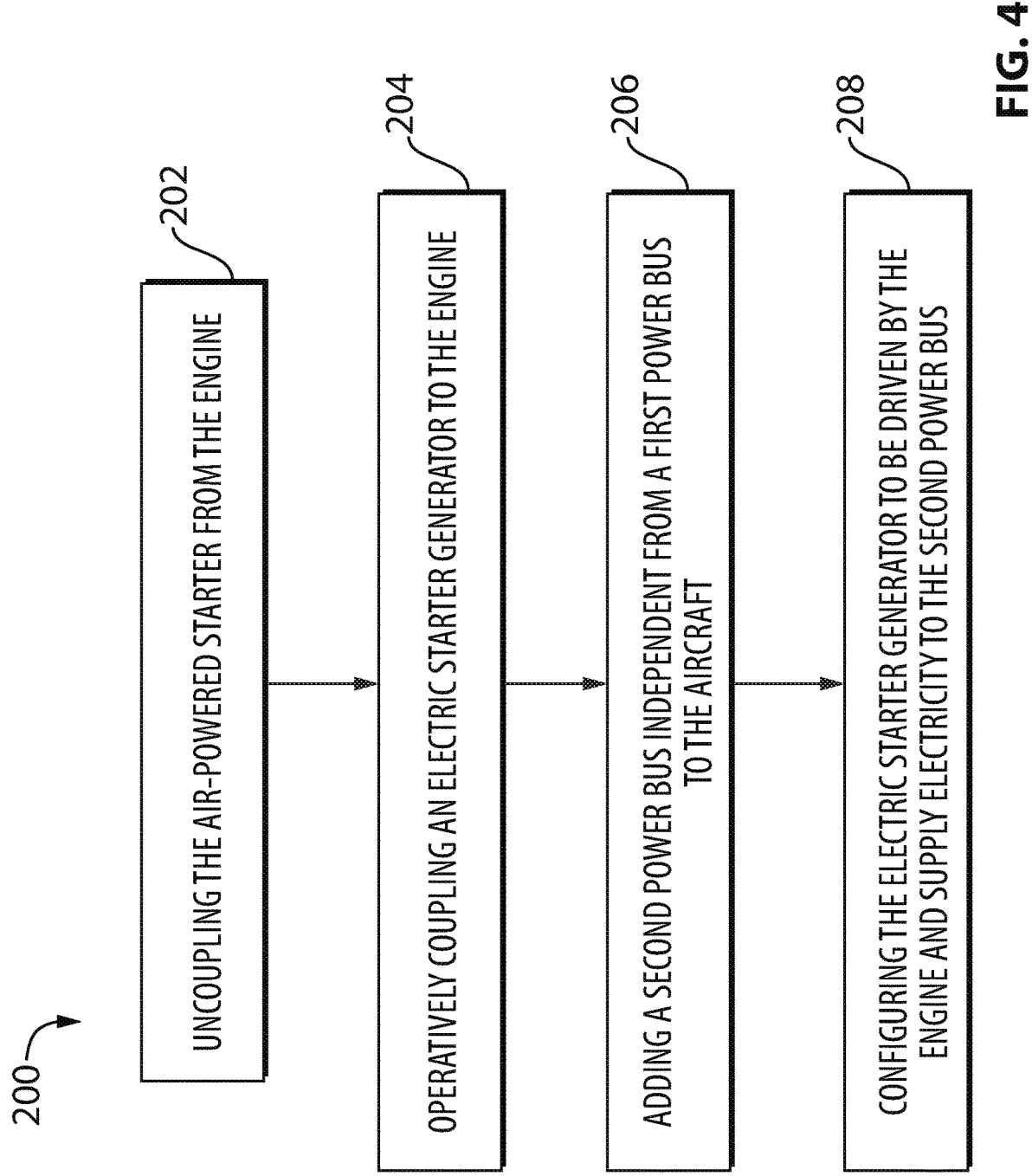

ELECTRICAL SYSTEM FOR AIRCRAFT

CROSS-REFERENCE TO RELATED APPLICATION AND CLAIM OF PRIORITY

The present application claims priority to U.S. Provisional Patent Application Ser. No. 62/681,323 filed on Jun. 6, 2018, the entire contents of which are hereby incorporated by reference.

TECHNICAL FIELD

The disclosure relates generally to aircraft, and more particularly to electrical systems of aircraft.

BACKGROUND

Specialized "special mission" aircraft can carry specialized equipment for special (e.g. sometimes unique) mission requirements. Such specialized equipment can comprise electric loads additional to the basic electric loads of the aircraft. Accordingly, specialized aircraft can require specialized electrical systems that are configured to accommodate the needs of such specialized equipment. Since, a specialized electrical system can have an architecture that is significantly different from a baseline electrical system of a similar but non-specialized aircraft that is already certified, such architecture of the specialized electrical system must be separately certified by the applicable certification authorities.

SUMMARY

In one aspect, the disclosure describes an electrical system for a specialized aircraft. The system comprises:
- an electric generator operatively coupled to an engine of the aircraft;
- a baseline power bus configured to distribute electricity to one or more baseline electric loads, the electric generator supplying electricity to the baseline power bus when the electric generator is driven by the engine;
- an electric starter generator operatively coupled to the engine, the electric starter generator being configured to operate as a motor to start the engine and to operate as a generator when driven by the engine; and
- a supplemental power bus configured to distribute electricity to one or more supplemental electric loads different from the one or more baseline electric loads, the supplemental power bus being independent from the baseline power bus, the electric starter generator supplying electricity to the supplemental power bus when the electric starter generator is driven by the engine.

The electric generator and the electric starter generator may be operatively coupled to the engine via separate mounting pads on a same accessory gearbox.

The electric starter generator may be operatively coupled to the engine via an adaptor gearbox.

The electric generator and the electric starter generator may be housed in a nacelle of the engine.

The supplemental power bus may be connectable to a battery for powering the electric starter generator during starting of the engine.

The supplemental power bus may be connectable to an electric generator operatively coupled to an auxiliary power unit.

The supplemental power bus may be connectable to a power source external to the aircraft.

In some embodiments of the electrical system, the engine is a first engine, the electric generator is a first electric generator, the baseline power bus is a first baseline power bus, the one or more baseline electric loads are one or more first baseline electric loads, the electric starter generator is a first electric starter generator, the supplemental power bus is a first supplemental power bus and the one or more supplemental electric loads are one or more first supplemental electric loads, the system comprises:
- a second electric generator operatively coupled to a second engine of the aircraft;
- a second baseline power bus configured to distribute electricity to one or more second baseline electric loads, the second electric generator supplying electricity to the second baseline power bus when the second electric generator is driven by the second engine;
- a second electric starter generator operatively coupled to the second engine, the second electric starter generator being configured to operate as a motor to start the second engine and to operate as a generator when driven by the second engine; and
- a second supplemental power bus configured to distribute electricity to one or more second supplemental electric loads different from the one or more second baseline electric loads, the second supplemental power bus being independent from the second baseline power bus, the second electric starter generator supplying electricity to the second supplemental power bus when the second electric starter generator is driven by the second engine.

The first and second supplemental busses may be configured to permit power transfer between the first and second supplemental busses.

The first electric starter generator may be connectable to receive electricity from the second electric starter generator during starting of the first engine.

Embodiments can include combinations of the above features.

In another aspect, the disclosure describes a method of operating an electrical system of a specialized aircraft. The method comprises:
- generating electricity using an electric generator operatively coupled to an engine of the aircraft;
- supplying the electricity generated using the electric generator to a baseline power bus;
- generating electricity using an electric starter generator operatively coupled to the engine; and
- supplying the electricity generated using the electric starter generator to a supplemental power bus independent from the baseline power bus.

The method may comprise transferring motive power from the engine to the electric generator and to the electric starter generator via a same accessory gearbox.

The method may comprise transferring motive power from the engine to the electric starter generator via a an adaptor gearbox.

The method may comprise connecting the supplemental power bus to a battery for powering the electric starter generator during starting of the engine.

The method may comprise connecting the supplemental power bus to an electric generator operatively coupled to an auxiliary power unit for powering the electric starter generator during starting of the engine.

The method may comprise connecting the supplemental power bus to an electric generator operatively coupled to a power source external to the aircraft for powering the electric starter generator during starting of the engine.

In some embodiments of the method, the electric starter generator is a first electric starter generator and the engine is a first engine, the method comprises supplying electricity to the first electric starter generator from a second electric starter generator operatively coupled to a second engine during starting of the first engine.

The electric generator and the electric starter generator may be housed in a nacelle of the engine.

Embodiments can include combinations of the above features.

In a further aspect, the disclosure describes a method for increasing an electric generating capacity of an aircraft comprising an engine, an air-powered starter for starting the engine and an electric generator configured to be driven by the engine and supply electricity to a first power bus. The method comprises:
uncoupling the air-powered starter from the engine;
operatively coupling an electric starter generator to the engine for starting the engine;
adding a second power bus to the aircraft, the second power bus being independent from the first power bus; and
configuring the electric starter generator to be driven by the engine and supply electricity to the second power bus.

The method may comprise:
uncoupling the air-powered starter from a mounting pad of an accessory gearbox operatively coupled to the engine; and
operatively coupling the electric starter generator to the engine via the mounting pad.

The electric generator may be operatively coupled to the engine via an accessory gearbox and the method may comprise operatively coupling the electric starter generator to the engine via the accessory gearbox.

The method may comprise coupling the electric starter generator to the engine via an adaptor gearbox.

The method may comprise housing the electric starter generator in a nacelle of the engine.

The second power bus may be connectable to a battery for powering the electric starter generator during starting of the engine.

The second power bus may be connectable to a power source external to the aircraft for powering the electric starter generator during starting of the engine.

The second power bus may be connectable to an electric generator operatively coupled to an auxiliary power unit for powering the electric starter generator during starting of the engine.

The method may comprise modifying a nacelle of the engine to accommodate the electric starter generator.

Embodiments can include combinations of the above features.

In a further aspect, the disclosure describes an aircraft comprising a system as disclosed herein.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a flowchart illustrating a method for increasing the electric generating capacity of an aircraft;

DETAILED DESCRIPTION

The following disclosure relates to specialized (e.g., "special mission") aircraft that are equipped to meet special mission requirements. Specialized aircraft can sometimes be produced by converting an existing and certified baseline aircraft configuration to meet the special mission requirements. Specialized aircraft (e.g., search and rescue, maritime patrol, communications management, command and control, troop and/or cargo transport, aerial survey, meteorological measurements, medical evacuation, air ambulance, air hospital, flight inspection) can have non-conventional specialized mission-specific equipment (e.g., radars, jammers, medical equipment, communications equipment, self-protection systems, etc.) that is not normally onboard a passenger aircraft designed for civil aviation for example. Accordingly, the specialized equipment can comprise supplemental electric loads additional to baseline aircraft electric loads and can require supplemental electric generating capacity that is beyond the already-certified baseline electrical system architecture of the baseline aircraft that is being converted.

In various embodiments, the methods and systems disclosed herein can facilitate the conversion of an already-certified baseline aircraft into a specialized aircraft. For example, the systems and methods disclosed herein can facilitate the increase of electric generating capacity of an aircraft without significantly altering the existing baseline electrical system architecture of the aircraft. In some embodiments, a method disclosed herein can comprise replacing an air-powered starter coupled to an engine of the aircraft with an electric starter generator where the electric starter generator powers a supplemental power bus that is independent from one or more baseline power busses of the aircraft. The use of an electric starter generator instead of air-powered starter can increase the electricity generating capacity onboard an aircraft that is being converted to a specialized aircraft. In some situations, the use of an electric starter generator instead of an air-powered starter can also improve control over the starting of the engine and also provide reliability and/or maintenance improvements. In some embodiments, the use of an electric starter generator in combination with a supplemental power bus that is independent from one or more baseline power busses of the aircraft being converted allows for some or all of the baseline already-certified electrical system architecture to be retained on the specialized aircraft in order to reduce certification efforts for the specialized aircraft.

Aspects of various embodiments are described through reference to the drawings.

Figure 1:
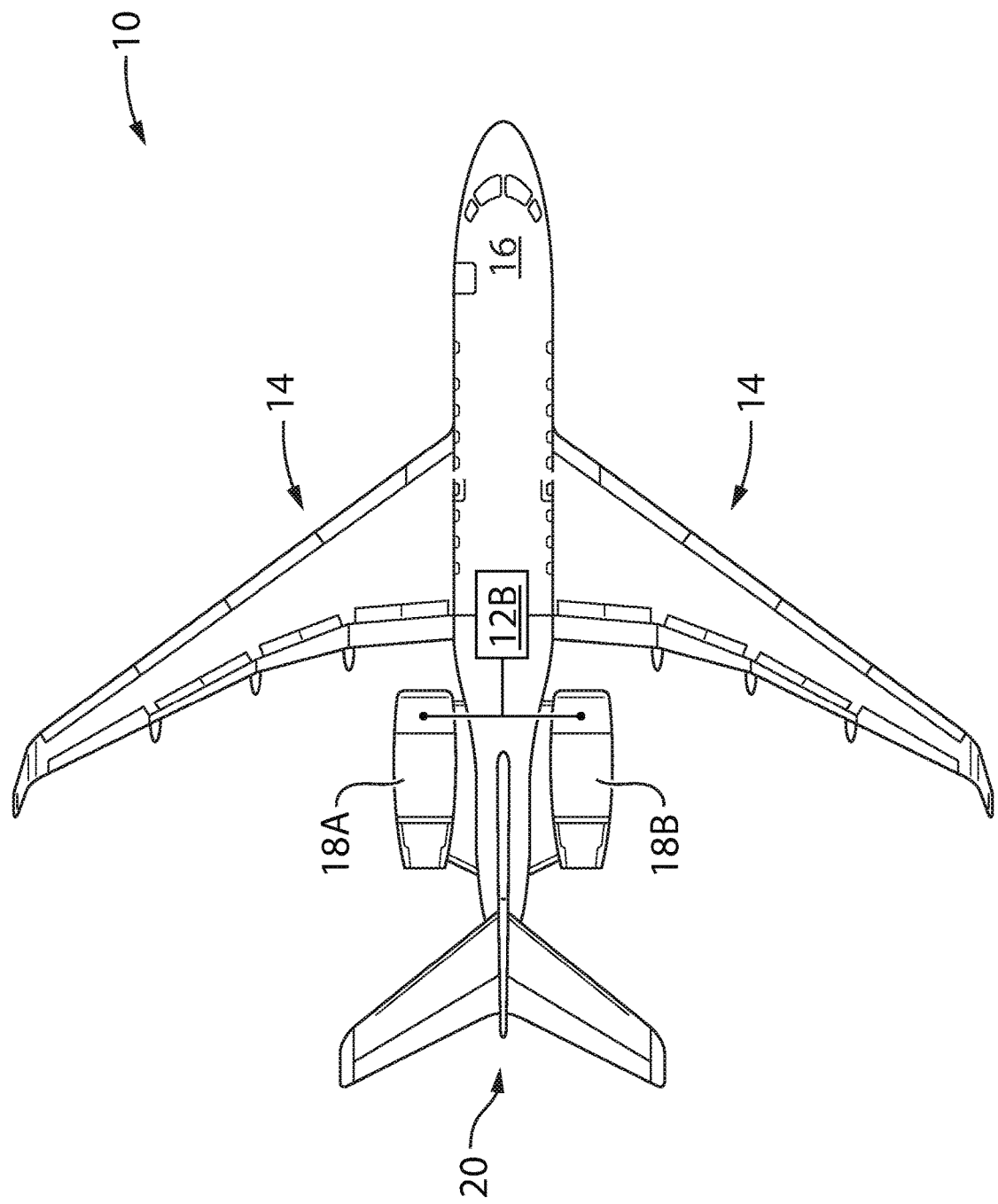
FIG. 1 is a top plan view of an exemplary aircraft comprising a specialized system.

FIG. 1 is a top plan view of an exemplary aircraft 10, which can comprise specialized electrical system 12B as described below. Aircraft 10 can be any type of aircraft such as corporate (e.g., business jet), private, commercial and passenger aircraft suitable for civil aviation, that has been converted into a specialized aircraft. For example, aircraft 10 can be a narrow-body, twin-engine jet airliner or can be an ultra-long range business jet. Aircraft 10 can be a fixed-wing aircraft. Aircraft 10 can comprise wings 14, fuselage 16, one or more engines 18 and empennage 20.

Figure 2A:
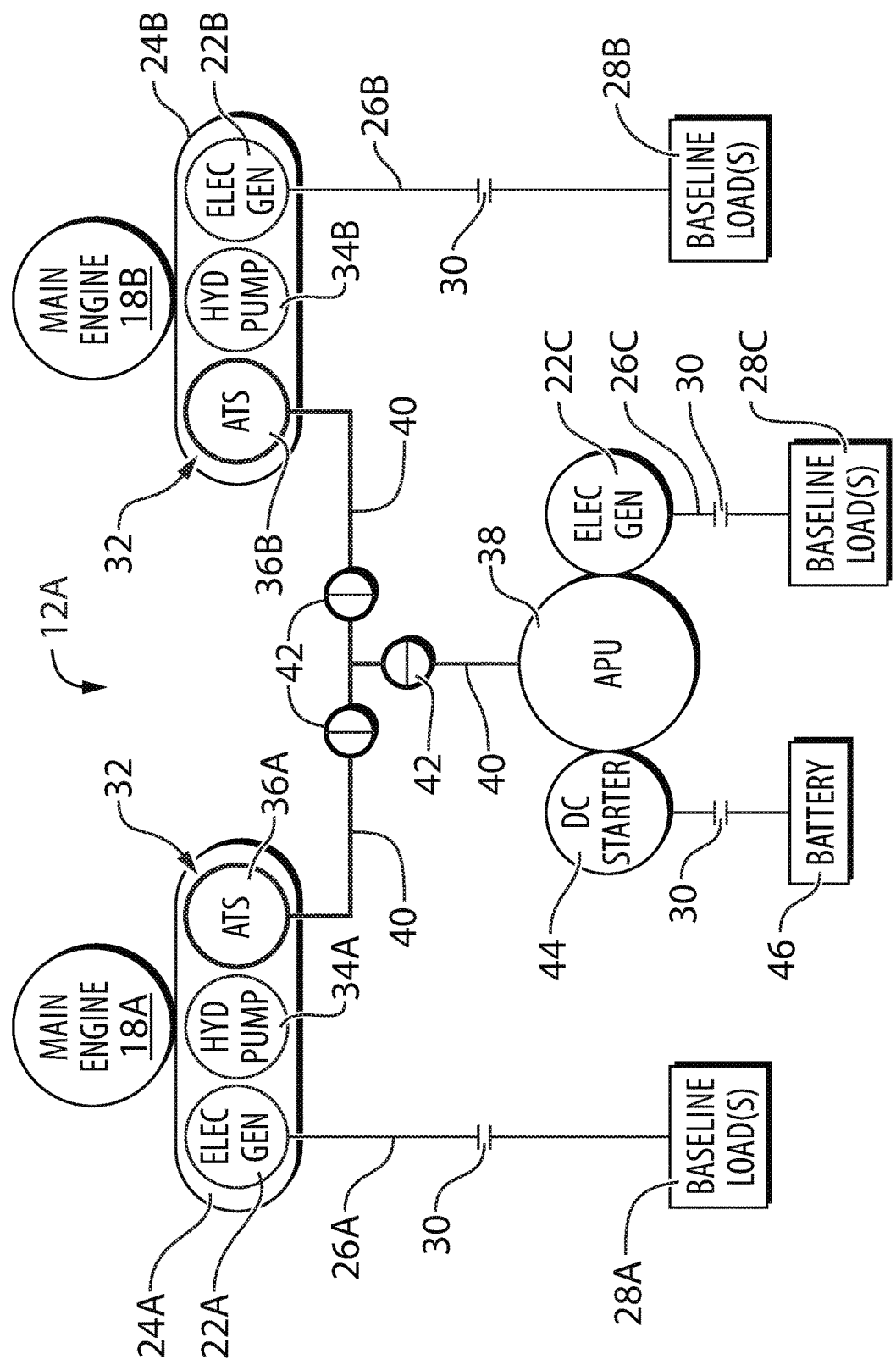
FIG. 2A is a schematic representation of an exemplary baseline system of the aircraft of FIG. 1.

FIG. 2A is a schematic representation of an exemplary baseline electrical system 12A of a baseline (i.e., non-specialized) version of aircraft 10. Baseline system 12A can correspond to an already-certified system architecture that is configured to accommodate the basic electric needs of the baseline version of aircraft 10 that is being converted into a specialized aircraft. Even though FIG. 2A illustrates a baseline system 12A that comprises two engines 18A, 18B, it is understood that aspects of this disclosure are also applicable to aircraft that include a single engine 18A or that include two or more engines 18A, 18B.

In the exemplary embodiment illustrated, baseline system 12A can comprise electric generators 22A, 22B (referred generally herein using reference numeral 22) operatively coupled to respective engines 18A, 18B (referred generally herein using reference numeral 18) via respective accessory gearboxes (AGBs) 24A, 24B (referred generally herein using reference numeral 24). Each electric generator 22 can be configured to supply electricity to a respective baseline power bus 26A or 26B (referred generally herein using reference numeral 26) when driven by the respective engine 18. Each baseline power bus 26 can be configured to distribute electricity to one or more baseline electric loads 28A, 28B (referred generally herein using reference numeral 28). Baseline electric loads 28 can comprise electric loads that serve the basic needs of aircraft 10 and that can be included in the baseline configuration of aircraft 10. Each baseline power bus 26 can be connectable to respective one or more baseline electric loads 28 via one or more contactors 30.

In some embodiments of baseline system 12A, two or more electric generators 22A can be operatively coupled to engine 18A via AGB 24A and such two or more electric generators 22A can be configured to supply electricity to one or more baseline power busses 26A. Similarly, in some embodiments, two or more electric generators 22B can be operatively coupled to engine 18B via AGB 24B and such two or more electric generators 22B can be configured to supply electricity to one or more baseline power busses 26B.

AGBs 24 can each comprise one or more mounting pads 32 for interfacing with suitable accessories such as electric generators, starters and pumps during operation of engines 18. For example, one or more mounting pads 32 can be used to extract motive power from engines 18 for driving electric generators 22 and/or hydraulic pumps 34A, 34B via respective AGBs 24. One or more mounting pads 32 can be used to inject motive power into engines 18 via respective air-powered (e.g., turbine) starters (ATS's) 36A, 36B (referred generally herein using reference numeral 36). Air-powered starters 36 can be used during starting of respective engines 18. Air-powered starters 36 can be powered with compressed air produced by an auxiliary power unit (APU) 38 which can be onboard aircraft 10 or with compressed air supplied by a ground-based source/cart external to aircraft 10. Compressed air generated by APU 38 can be delivered to air-powered starters 36 via suitable ducts 40 and valves 42.

APU 38 can comprise a device that supplies energy (e.g., electricity, compressed air) for functions other than propulsion. In some embodiments, APU 38 can comprise a gas turbine engine. Electric generator 22C can be operatively coupled to be driven by APU 38. Electric generator 22C can be configured to supply electricity to baseline power bus 26C. Baseline power bus 26C can be configured to distribute electricity to one or more baseline loads 28C. Direct current (DC) starter 44 can be operatively coupled to APU 38 for the purpose of starting APU 38. DC starter 44 can be powered by electricity provided by battery 46 via contactor 30.

Figure 2B:
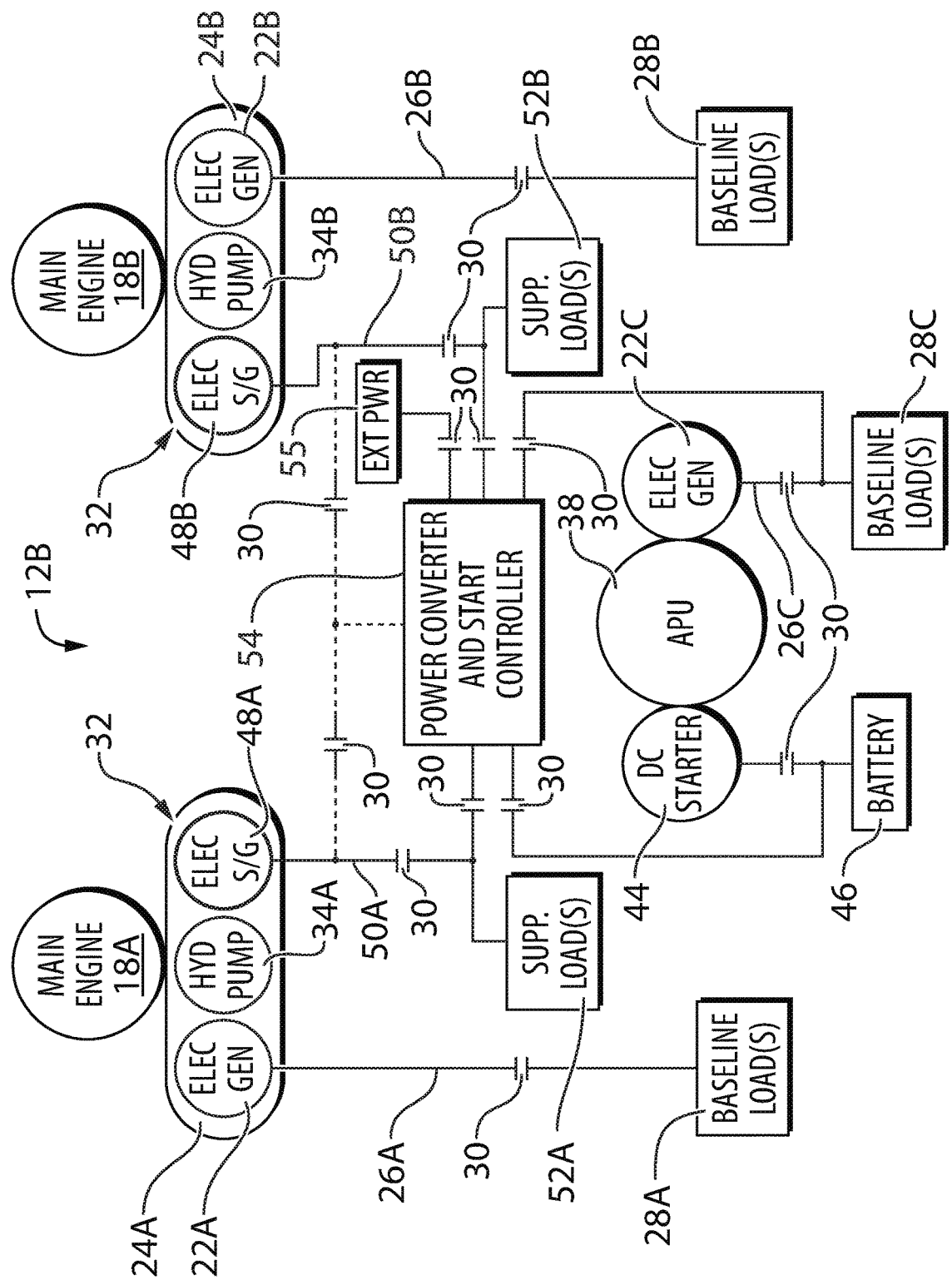
FIG. 2B is a schematic representation of an exemplary specialized system of the aircraft of FIG. 1.

FIG. 2B is a schematic representation of an exemplary specialized electrical system 12B of specialized aircraft 10. In some embodiments, specialized system 12B can be a modification of baseline system 12A shown in FIG. 2A. Elements of specialized system 12B already described above in relation to baseline system 12A are referenced using like reference numerals. Even though FIG. 2B illustrates a specialized system 12B that comprises two engines 18A, 18B, it is understood that aspects of this disclosure are also applicable to aircraft that include a single engine 18A or that include more than two engines 18A, 18B. For example, in some embodiments, system 12B can include electric generator 22A, baseline power bus 26A, electric starter generator 48A and supplemental power bus 50A. Baseline power bus 26A can be configured to distribute electricity to one or more baseline electric loads 28A. Electric generator 22A can be operatively coupled to engine 18A so as to be driven via motive power extracted from engine 18A via AGB 24A for example. Electric generator 22A can supply electricity to baseline power bus 26A when electric generator 22A is driven by engine 18A. Electric starter generator 48A can be operatively coupled to engine 18A. Electric starter generator 48A can be configured to operate as a motor to start engine 18A and to operate as a generator when driven by engine 18A. Supplemental power bus 50A can be configured to distribute electricity to one or more supplemental electric loads 52A that are different from the one or more baseline electric loads 28A. Electric starter generator 48A can supply electricity to supplemental power bus 50A when electric starter generator 48A is driven by motive power extracted from engine 18A via AGB 24A for example.

Electric starter generator 48A can be of any suitable type that provides required electrical power when operating as a generator and that provides required torque when operating as a motor. In various embodiments, electric starter generator 48A can provide DC voltage (e.g., 270 V) or variable frequency AC voltage (e.g., 115/230 V or 230/400 V). In some embodiments, electric starter generator 48 can be a variable frequency starter generator. In some embodiments, electric starter 48 can be a DC brushless starter generator In some embodiments of specialized system 12B, two or more electric generators 22A can be operatively coupled to engine 18A via AGB 24A and such two or more electric generators 22A can be configured to supply electricity to one or more baseline power busses 26A. Similarly, in some embodiments, two or more electric generators 22B can be operatively coupled to engine 18B via AGB 24B and such two or more electric generators 22B can be configured to supply electricity to one or more baseline power busses 26B.

In some embodiments, supplemental power bus 50A can be independent (i.e., segregated) from baseline power bus 26A. Power busses 26A, 50A can each comprise a common wire/conductor to which one or more power users (i.e., electric loads) are connected. For example, each power bus 26A, 50A can be a common source of power for one or more related electrical loads 28A or 52A. Power busses 26A and 50A can be part of respective independent electrical subsystems. For example, baseline power bus 26A can be part of a baseline (e.g., previously certified) electrical system that is configured to cater to the baseline needs of aircraft 10, and, supplemental power bus 50A can be part of supplemental electrical system that is configured to cater to the specialized equipment of specialized aircraft 10.

Power busses 26A and 50A can be independent from each other in that they can have their own separate power sources and their own separate electric loads. For example, the electricity supplied to baseline power bus 26A can be generated independently of the electricity supplied to supplemental power bus 50A via separate electric generator 22A and electric starter generator 48A respectively. In some embodiments, baseline power bus 26A and supplemental power bus 50A can be (e.g., permanently) electrically isolated from each other so that no exchange of electricity is possible between the two power busses 26A, 50A. Accordingly, in some embodiments, there are no interconnections between the two power busses 26A, 50A. In some embodiments where no exchange of electricity is possible between power busses 26A, 50A, baseline power bus 26A and supplemental power bus 50A can be non-redundant. The independence (i.e., segregation) of baseline power bus 26A and supplemental power bus 50A and their associated electrical systems allows for some or all of the already-certified baseline electrical system architecture to be retained in specialized aircraft 10 and can consequently simplify certification efforts for specialized aircraft 10.

In some embodiments, electric generator 22A and electric starter generator 48A can be operatively coupled to engine 18A via separate mounting pads 32 on the same AGB 24A. In cases where the implementation of specialized system 12B includes the replacement of air-powered starter 36A with electric starter generator 48A, the same (i.e., starter) mounting pad 32 from which air-powered starter 36A is removed can be used to operatively couple electric starter generator to AGB 24A.

Specialized system 12B can comprise power converter and controller 54 configured to selectively control one or more contactors 30 of specialized system 12B and consequently control the flow/distribution of electricity throughout part of specialized system 12B. Power converter and controller 54 can also include suitable power converting and/or conditioning equipment. The actions of power converter and controller 54 can be based on one or more inputs such as sensed inputs, pilot commands, commands from other operators or other systems of aircraft 10 that may be in communication with power converter and controller 54. Power converter and controller 54 can comprise one or more data processors and one or more computer-readable memories storing machine-readable instructions executable by the data processor(s) and configured to cause power converter and controller 54 to perform steps to implement a computer-implemented process. In some embodiments, power converter and controller 54 can be configured to carry out power distribution functions by controlling the state of one or more contactors 30. For example, supplemental power bus 50A can be selectively connectable to battery 46 for powering electric starter generator 48A during starting of engine 18A. For example, power converter and controller 54 can be configured to, in response to an engine start command, establish an electrical connection between starter generator 48A and battery 46 (or other power source(s)) by controlling the state of one or more contactors 30. In some embodiments, power converter and controller 54 can be configured to provide suitable DC to DC power conversion of electricity supplied to electric starter generator 48A from battery 46 during starting of engine 18A for example.

In the context of a multi-engine aircraft, system 12B can further include electric generator 22B, baseline power bus 26B, electric starter generator 48B and supplemental power bus 50B. Baseline power bus 26B can be configured to distribute electricity to one or more baseline electric loads 28B. Electric generator 22B can be operatively coupled to engine 18B so as to be driven via motive power extracted from engine 18B via AGB 24B for example. Electric generator 22B can supply electricity to baseline power bus 26B when electric generator 22B is driven by engine 18B. Electric starter generator 48B can be operatively coupled to engine 18B. Electric starter generator 48B can be configured to operate as a motor to start engine 18B and to operate as a generator when driven by engine 18B. Supplemental power bus 50B can be configured to distribute electricity to one or more supplemental electric loads 52B that are different from the one or more baseline electric loads 28B. Electric starter generator 48B can supply electricity to supplemental power bus 50B when electric starter generator 48B is driven by motive power extracted from engine 18B via AGB 24B for example. It is understood that the description provided above in relation to electric generator 22A, baseline power bus 26A, electric starter generator 48A and supplemental power bus 50A is also applicable to electrical systems that rely on multiple engines for power generation.

Even though, FIG. 2B illustrates the use of both engines 18 for the generation of supplemental electric power, it is understood that, depending on the needs, specialized system 12B can make use of fewer than all engines available on aircraft 10 for the generation of supplemental electric power (e.g., using electric starter generator 48) for powering supplemental electric loads 52.

In various embodiments, supplemental power busses 50A, 50B (referred generally herein using reference numeral 50) may or may not be independent from each other. For example, in some embodiments an exchange of electricity between supplemental power busses 50A, 50B can be possible via the actuation of one or more contactors 30 under the control of power converter and controller 54 or otherwise. Accordingly, in some embodiments, supplemental power busses 50A, 50B can be at least partially redundant. For example, in some embodiments, specialized system 12B can be configured to permit either or both electric starter generators 48A, 48B (referred generally herein using reference numeral 48) to supply electricity to either or both of supplemental busses 50A, 50B. In some embodiments, specialized system 12B can be configured to permit either or both electric starter generators 48A, 48B to supply electricity to baseline electric bus 26C for example. In some embodiments, specialized system 12B can be configured to permit either or both electric starter generators 48A, 48B to receive electricity from battery 46 (e.g., via power converter and controller 54) during starting of engines 18A, 18B for example.

In some embodiments, specialized system 12B can be configured to permit either or both supplemental power busses 50A, 50B to receive electricity from external power source 55, which can be external to aircraft 10 and connectable to specialized system 12B when aircraft 10 is on the ground for example. Such external power source 55 can be used to power one or more supplemental loads 52A, 52B when engines 18A, 18B are off for example. Such external power source 55 can be used to power electric starter generator 48 (e.g., via power converter and controller 54) during starting of engine 18 for example. Such external power source 55 can be used to power DC starter 44 during starting of APU 38 and/or to power baseline electric load(s) 28C via power converter and controller 54.

In some embodiments, specialized system 12B can be configured to selectively permit either or both electric starter generators 48A, 48B to receive electricity from electric generator 22C (e.g., via power converter and controller 54) during starting of engines 18A, 18B for example.

In some embodiments, specialized system 12B can be configured to selectively permit electric starter generators 48A to receive electricity from electric generator 48B (e.g., via power converter and controller 54) during starting of engine 18A for example.

In some embodiments, specialized system 12B can be configured to selectively permit electric starter generators 48B to receive electricity from electric generator 48A (e.g., via power converter and controller 54) during starting of engine 18B for example.

In some embodiments where engine 18A is disposed on a first (e.g., left hand side) of aircraft 10 and engine 18B is disposed on a second (e.g., right hand side) of aircraft 10, baseline load(s) 28A and supplemental load(s) 52A can be disposed on the first side of aircraft 10, and, baseline load(s) 28B and supplemental load(s) 52B can be disposed on the second side of aircraft 10.

Figure 3:
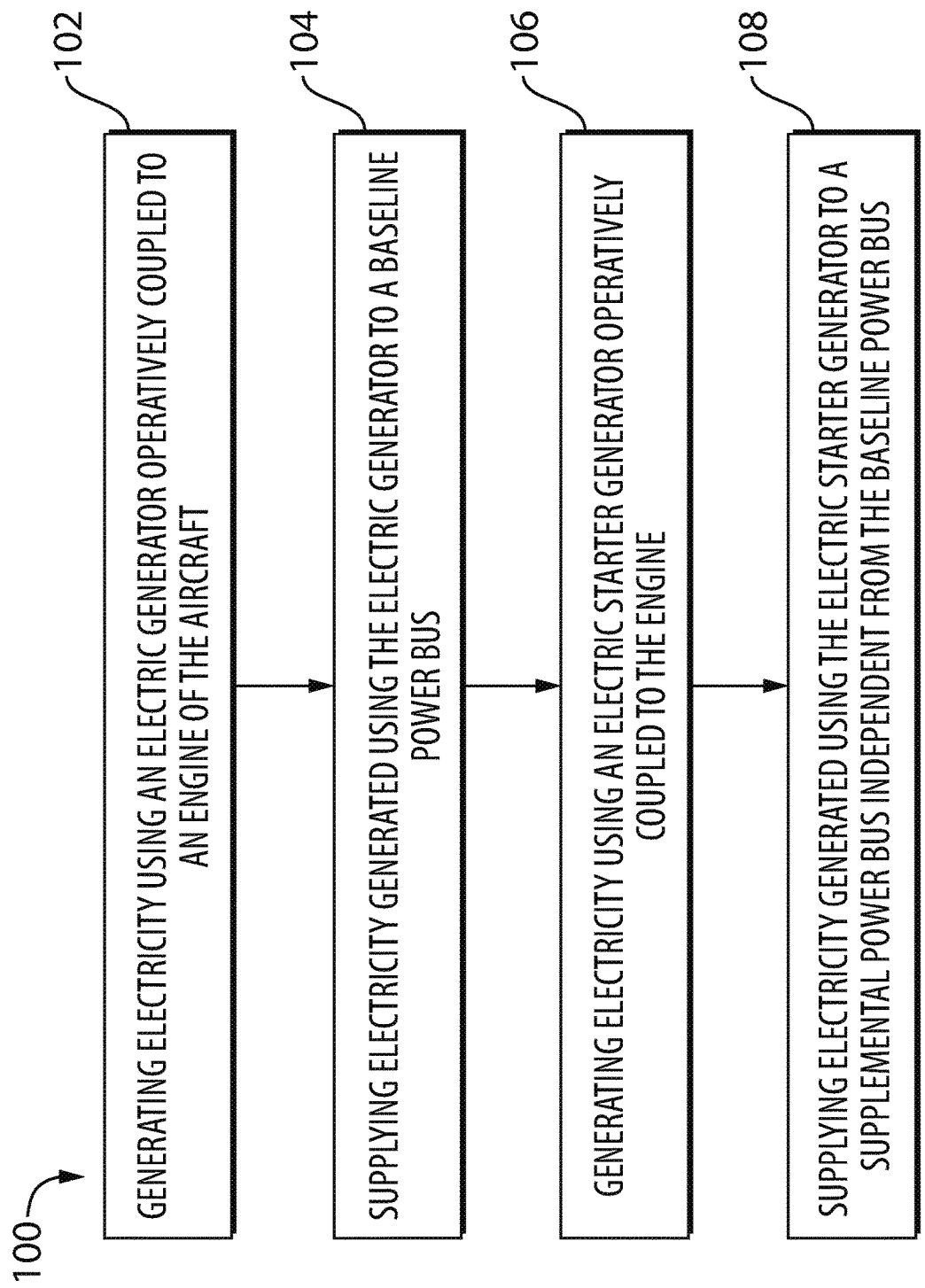
FIG. 3 is a flowchart illustrating a method for operating the specialized system of the aircraft of FIG. 2B.

FIG. 3 is a flowchart illustrating method 100 for operating the specialized system 12B of specialized aircraft 10. Method 100 can be performed using specialized system 12B as shown in FIG. 2B or other system architectures. Method 100 can comprise:
  generating electricity using electric generator 22 operatively coupled to engine 18 of aircraft 10 (see block 102);
  supplying the electricity generated using electric generator 22 to baseline power bus 26 (see block 104);
  generating electricity using electric starter generator 48 operatively coupled to engine 18 (see block 106); and
  supplying the electricity generated using electric starter generator 48 to supplemental power bus 50 independent from baseline power bus 26 (see block 108).

Method 100 can comprise transferring motive power from engine 18 to electric generator 22 and to electric starter generator 48 via a same AGB 24. In some embodiments, method 100 can comprise transferring motive power from engine 18 to electric starter generator 48 via adaptor gearbox 56 (shown in FIG. 5C).

In some embodiments, method 100 can comprise connecting supplemental power bus 50 to battery 46 for powering electric starter generator 48 during starting of engine 18.

In some embodiments, method 100 can comprise connecting supplemental power bus 50 to electric generator 22C operatively coupled to APU 38 for powering electric starter generator 48 during starting of engine 18.

In some embodiments, method 100 can comprise connecting supplemental power bus 50 to power source 55 external to aircraft 10 for powering electric starter generator 48 during starting of engine 18.

In some embodiments, method 100 can comprise supplying electricity to electric starter generator 48A from electric starter generator 48B operatively coupled to engine 18B (while engine 18B is operating) during starting of engine 18A.

FIG. 4 is a flowchart illustrating method 200 for increasing an electric generating capacity of an aircraft comprising engine 18, air-powered starter 36 for starting engine 18 and electric generator 22 configured to be driven by engine 18 and supply electricity to baseline power bus 26. The description of method 200 below is made in reference to FIGS. 2A and 2B and also in reference to FIGS. 5A-5C. In some embodiments, method 200 can facilitate the conversion of a baseline aircraft to a specialized aircraft 10. Method 200 can comprise:
  uncoupling air-powered starter 36 from engine 18 (see block 202);
  operatively coupling electric starter generator 48 to engine 18 for starting engine 18 (see block 204);
  adding supplemental power bus 50 to aircraft 10, supplemental power bus 50 being independent from baseline power bus 26; and
  configuring electric starter generator 48 to be driven by engine 18 and supply electricity to supplemental power bus 50 (see block 206).

In some embodiments, method 200 can comprise replacing air-powered starter 36 with electric starter generator 48 on a same mounting pad 32 of AGB 24 operatively coupled to engine 18. In other words, method 200 can comprise uncoupling air-powered starter 36 from mounting pad 32 of AGB 24 and operatively coupling electric starter generator 48 to engine 18 via the same mounting pad 32. Uncoupling air-powered starter 36 can comprise physically removing air-powered starter 36 from engine 18.

In some embodiments, method 200 can comprise modifying nacelle 58 of engine 18 to accommodate and cover electric starter generator 48. Modifying nacelle 58 can comprising expanding an amount of space available inside nacelle 58 to accommodate electric starter generator 48. In some embodiments, expanding the amount of space inside nacelle 58 can comprise incorporating an aerodynamically-shaped bulge in nacelle 58 where the interior of such bulge can be used to accommodate electric starter generator 48 and/or any additional equipment associated therewith.

In some embodiments, electric generator 22 can be operatively coupled to engine 18 via AGB 24 and method 200 can comprise operatively coupling electric starter generator 48 to engine 18 via AGB 24. In some embodiments, method 200 can comprise coupling electric starter generator 48 to engine 18 via adaptor gearbox 56 (see FIG. 5C). In some embodiments, electric starter generator 48 can be housed in nacelle 58 of engine 18 (see FIGS. 5A-5C).

In some embodiments, supplemental power bus 50 can be connectable to battery 46 for powering electric starter generator 48 during starting of engine 18.

In some embodiments, supplemental power bus 50 can be connectable to power source 55 external to aircraft 10 for powering electric starter generator 48 during starting of engine 18.

In some embodiments, supplemental power bus 50 can be connectable to electric generator 22C operatively coupled to APU 38 for powering electric starter generator 48 during starting of engine 18.

Figure 5A:
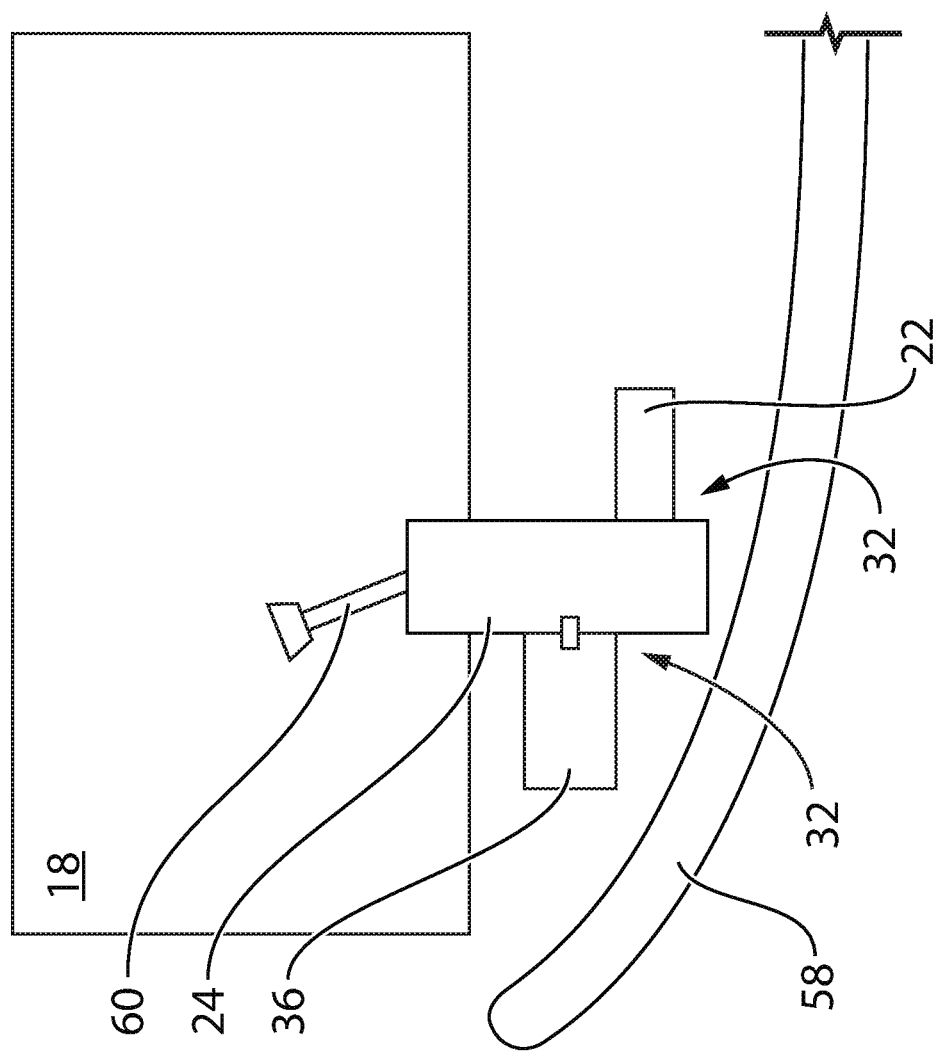
FIG. 5A is a schematic representation showing an accessory gearbox of the aircraft of FIG. 1 with an air-powered starter coupled to the accessory gearbox.
Figure 5B:
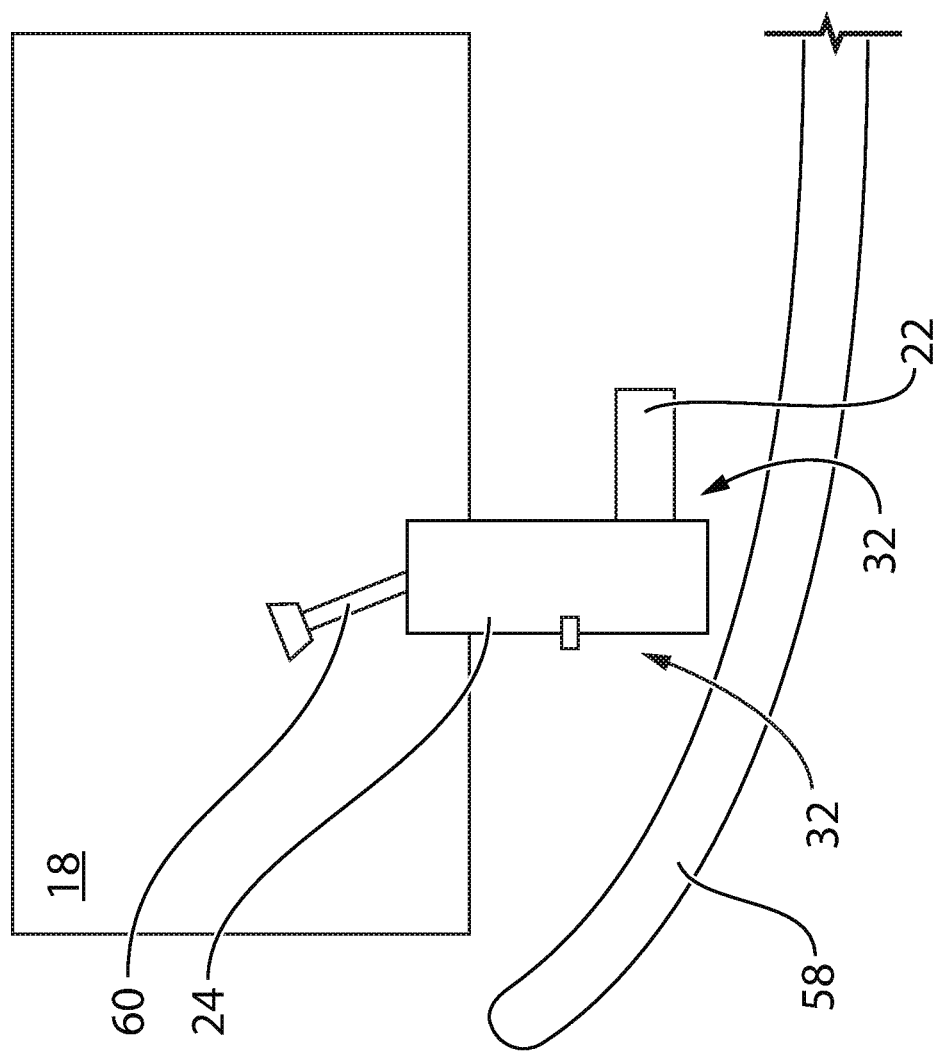
FIG. 5B a schematic representation showing the accessory gearbox of FIG. 5A with the air-powered starter is uncoupled from the accessory gearbox.
Figure 5C:
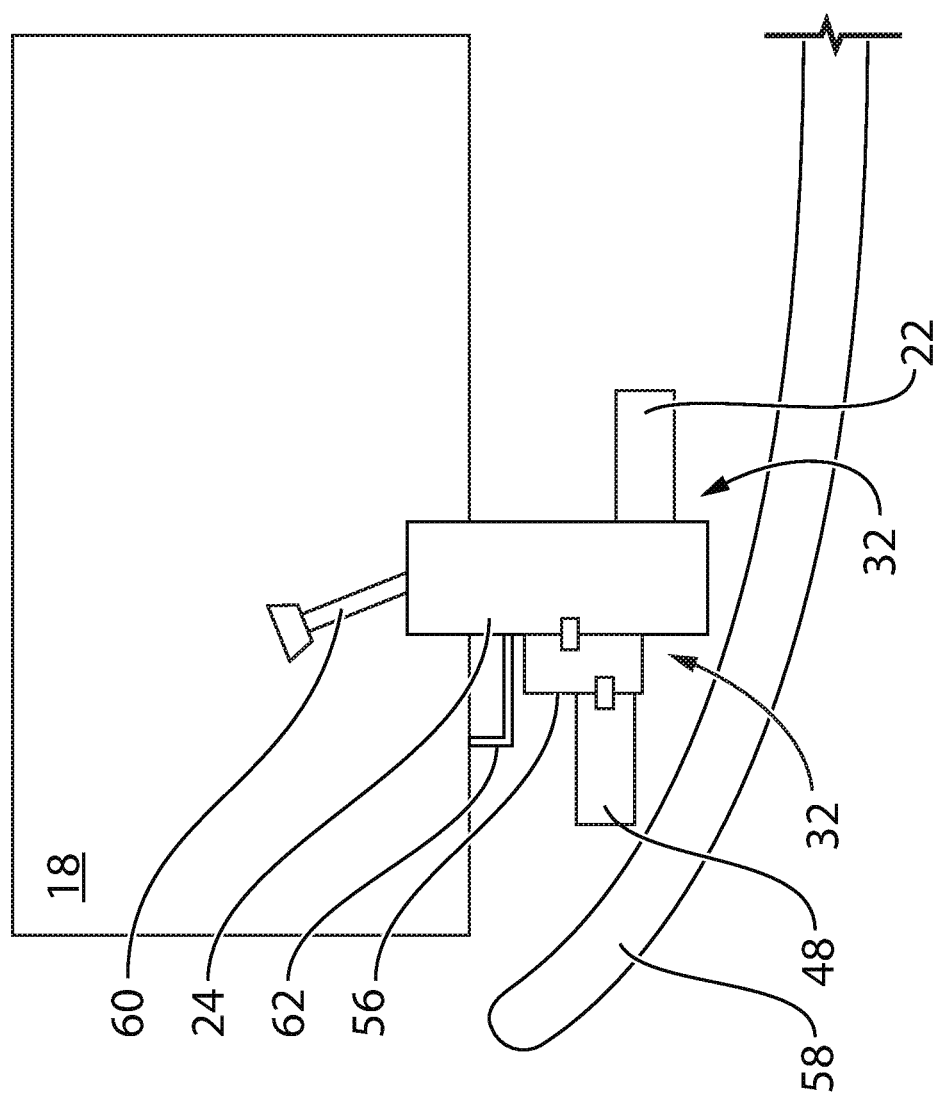
FIG. 5C a schematic representation showing the accessory gearbox of FIG. 5A with an electric starter generator coupled to the accessory gearbox.

FIGS. 5A-5C schematically show a sequence of operations associated with increasing the electric generation capacity of aircraft 10. FIG. 5A is a schematic representation of AGB 24 of engine 18 with electric generator 22 and air-powered starter 36 operatively coupled to AGB 24 via separate mounting pads 32. FIG. 5A schematically shows a portion of nacelle 58 which houses engine 18 and provides an aerodynamically-shaped covering for engine 18. AGB 24, air-powered starter 36 and electric generator 22 can be housed inside nacelle 58. AGB 24 can be drivingly coupled to a shaft of engine 18 via tower shaft 60. The configuration shown in FIG. 5A can be associated with baseline system 12A of FIG. 2A.

FIG. 5B a schematic representation of AGB 24 with air-powered starter 36 uncoupled therefrom so as to free the associated mounting pad 32.

FIG. 5C a schematic representation of AGB 24 with electric starter generator 48 coupled to AGB 24 via the same mounting pad 32 from which air-powered starter 36 was uncoupled. The configuration shown in FIG. 5C can be associated with specialized system 12B of FIG. 2B. In some embodiments, the installation of electric starter generator 48 can involve the use of one or more additional brackets 62 or other support(s) for physically supporting electric starter generator 48. It is understood that other peripheral (e.g., cooling) equipment (not shown) may be required for the integration of electric starter generator 48 with engine 18. In some embodiments, the same or a modified nacelle 58 shaped for aerodynamic efficiency can be used for housing electric starter generator 48. In some embodiments, the same nacelle 58 can be modified to accommodate electric starter generator 48 and associated equipment.

In some embodiments where a change in speed ratio is required between a shaft of electric starter generator 48 and an input/output of mounting pad 32 of AGB 24, electric starter generator 48 can be operatively coupled to AGB 24 via optional adaptor gearbox 56. Adaptor gearbox 56 can be disposed between electric starter generator 48 and the applicable mounting pad 32.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An electrical system for a specialized aircraft converted from a baseline version of the aircraft, the system comprising:
    a first electric generator operatively coupled to an engine of the aircraft;
    a baseline power bus configured to accommodate electrical needs of the baseline version of the aircraft and distribute electricity to one or more baseline electric loads, the first electric generator supplying electricity to the baseline power bus when the first electric generator is driven by the engine;
    an electric starter generator operatively coupled to the engine, the electric starter generator being configured to operate as a motor to start the engine and to operate as a generator when driven by the engine; and
    a supplemental power bus configured to distribute electricity to one or more supplemental electric loads different from the one or more baseline electric loads, the supplemental power bus being independent from the baseline power bus, the supplemental power bus providing generating capacity that is increased with respect to the baseline power bus of the baseline version of the aircraft being converted, the electric starter generator supplying electricity to the supplemental power bus when the electric starter generator is driven by the engine,
    wherein the supplemental power bus is connectable to a battery for powering the electric starter generator during starting of the engine, said battery further providing electricity for a direct current starter operatively connected to an auxiliary power unit of the specialized aircraft, said auxiliary power unit driving a second electric generator; and
    wherein the electric starter generator is operatively coupled to the engine via an accessory gearbox and an adaptor gearbox causing a change in speed ratio between a shaft of the electric starter generator and an input/output of a mounting pad of the accessory gearbox.

2. The electrical system as defined in claim 1, wherein the first electric generator and the electric starter generator are operatively coupled to the engine via separate mounting pads on the accessory gearbox.

3. The electrical system as defined in claim 1, wherein the first electric generator and the electric starter generator are housed in a nacelle of the engine.

4. The electrical system as defined in claim 1, wherein the supplemental power bus is connectable to the second electric generator.

5. The electrical system as defined in claim 1, wherein the supplemental power bus is connectable to a power source external to the aircraft.

6. The electrical system as defined in claim 1, wherein the engine is a first engine, the baseline power bus is a first baseline power bus, the one or more baseline electric loads are one or more first baseline electric loads, the electric starter generator is a first electric starter generator, the supplemental power bus is a first supplemental power bus and the one or more supplemental electric loads are one or more first supplemental electric loads, the system comprising:
    a third electric generator operatively coupled to a second engine of the aircraft;
    a second baseline power bus configured to distribute electricity to one or more second baseline electric loads, the third electric generator supplying electricity to the second baseline power bus when the third electric generator is driven by the second engine;
    a second electric starter generator operatively coupled to the second engine, the second electric starter generator being configured to operate as a motor to start the second engine and to operate as a generator when driven by the second engine; and
    a second supplemental power bus configured to distribute electricity to one or more second supplemental electric loads different from the one or more second baseline electric loads, the second supplemental power bus being independent from the second baseline power bus, the second electric starter generator supplying electricity to the second supplemental power bus when the second electric starter generator is driven by the second engine.

7. The electrical system as defined in claim 6, wherein the first and second supplemental busses are configured to permit power transfer between the first and second supplemental busses.

8. The electrical system as defined in claim 6, wherein the first electric starter generator is connectable to receive electricity from the second electric starter generator during starting of the first engine.

9. An aircraft comprising the electrical system as defined in claim 1.

10. A method of operating an electrical system of a specialized aircraft, the method comprising:
generating electricity using a first electric generator operatively coupled to an engine of the aircraft;
supplying the electricity generated using the first electric generator to a baseline power bus configured to accommodate electrical needs of a baseline version of the aircraft;
generating electricity using an electric starter generator operatively coupled to the engine;
supplying the electricity generated using the electric starter generator to a supplemental power bus independent from the baseline power bus, the supplemental power bus providing generating capacity that is increased with respect to the baseline power bus of the baseline version of the aircraft being converted;
connecting the supplemental power bus to a battery for powering the electric starter generator during starting of the engine, said battery further providing electricity for a direct current starter operatively connected to an auxiliary power unit of the specialized aircraft, said auxiliary power unit driving a second electric generator; and
transferring motive power from the engine to the electric starter generator via an accessory gearbox and an adaptor gearbox causing a change in speed ratio between a shaft of the electric starter generator and an input/output of a mounting pad of the accessory gearbox.

11. The method as defined in claim 10, comprising transferring motive power from the engine to the first electric generator and to the electric starter generator via the accessory gearbox.

12. The method as defined in claim 10, comprising connecting the supplemental power bus to the second electric generator for powering the electric starter generator during starting of the engine.

13. The method as defined in claim 10, comprising connecting the supplemental power bus to a power converter and controller operatively coupled to a power source external to the aircraft for powering the electric starter generator during starting of the engine.

14. The method as defined in claim 10, wherein the electric starter generator is a first electric starter generator and the engine is a first engine, the method comprising supplying electricity to the first electric starter generator from a second electric starter generator operatively coupled to a second engine during starting of the first engine.

15. The method as defined in claim 10, wherein the first electric generator and the electric starter generator are housed in a nacelle of the engine.

\* \* \* \* \*